United States Patent [19]
Muzzy

[11] 3,782,112
[45] Jan. 1, 1974

[54] HYBRID GENERATOR
[75] Inventor: Raymond J. Muzzy, Saratoga, Calif.
[73] Assignee: The United States of America as represented by the Secretary of the Navy, Washington, D.C.
[22] Filed: Feb. 24, 1972
[21] Appl. No.: 230,538

[52] U.S. Cl.................................. 60/251, 60/260
[51] Int. Cl............................................. F02k 9/06
[58] Field of Search...................... 60/220, 251, 260

[56] References Cited
UNITED STATES PATENTS

| | | | |
|---|---|---|---|
| 3,065,596 | 11/1962 | Schultz | 60/220 |
| 3,065,598 | 11/1962 | Schultz | 60/220 |
| 3,340,691 | 9/1967 | Mangum | 60/251 |
| 3,334,489 | 8/1967 | Vilet | 60/251 |
| 3,178,885 | 4/1965 | Loughran | 60/251 |

Primary Examiner—Samuel Feinberg
Attorney—R. S. Sciascia

[57] ABSTRACT

An improved hybrid injector to gasify and aerate a liquid oxidizer. A solid propellant gas generator is enclosed in an annular manifold surrounding the passageway leading from a source of liquid oxidizer to the main combustion chamber. Openings through the manifold communicate the gas generator with the liquid oxidizer passageway to thereby gasify and aerate the liquid oxidizer passing into the main combustion chamber.

9 Claims, 2 Drawing Figures

PATENTED JAN 1 1974 3,782,112

HYBRID GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A. Field of the Invention

The present invention relates generally to hybrid rocket motors, and more particularly to an improved hybrid rocket motor injector for a liquid oxidizer.

B. Description of the Prior Art

Since the mass flow distribution and break up of the liquid oxidizer from the injector of a hybrid rocket motor influences both the regression rate behavior and combustion efficiency within the combustion chamber, it can limit the amount of oxidizer that can flow through the combustion chamber and sustain combustion without flooding the grain. Local increases in the regression rate along the fuel grain are caused by the increased turbulence in the region where liquid particles impinge on the solid fuel surface.

The conventional techniques used to break up liquid oxidizers are a high pressure drop across the injector or use of aeration. In the first instance the subsequent higher pressure in the oxidizer supply system imposes design penalties such as higher weights of the tankage and feed systems. The use of aeration requires the use of a separate high pressure gas supply.

SUMMARY OF THE INVENTION

The present invention eliminates the system penalties referred to above and yet provides a method of substantially increasing the regression rate of the hybrid fuel by the use of vaporization and aeration.

OBJECTS OF THE INVENTION

An object of the present invention is to improve combustion efficiency in a hybrid rocket.

Another object is to provide a higher regression rate in a rocket.

A further object of the invention is to provide wider operational limits, i.e., a higher oxidizer mass flux.

Other objects, advantages, and novel features of the present invention will become apparent from the following detailed description of the invention when considered in conjunction with the accompanying drawings.

DESCRIPTION OF THE PREFERRED EMBODIMENT

Figure 2:
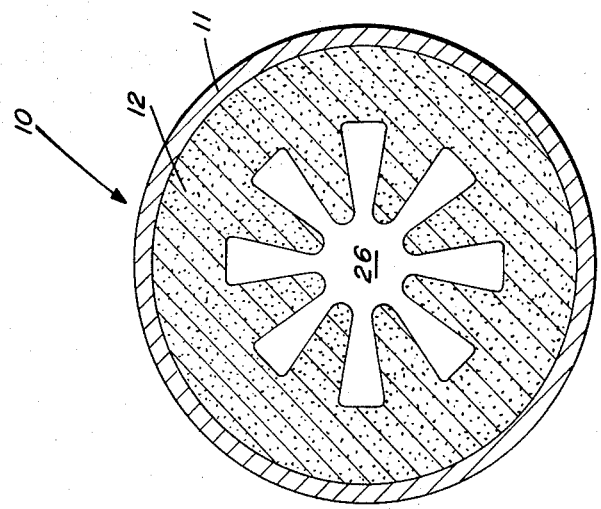
FIG. 2 is a cross-sectional view of the combustion chamber and solid propellant taken along lines 2—2.
Figure 1:
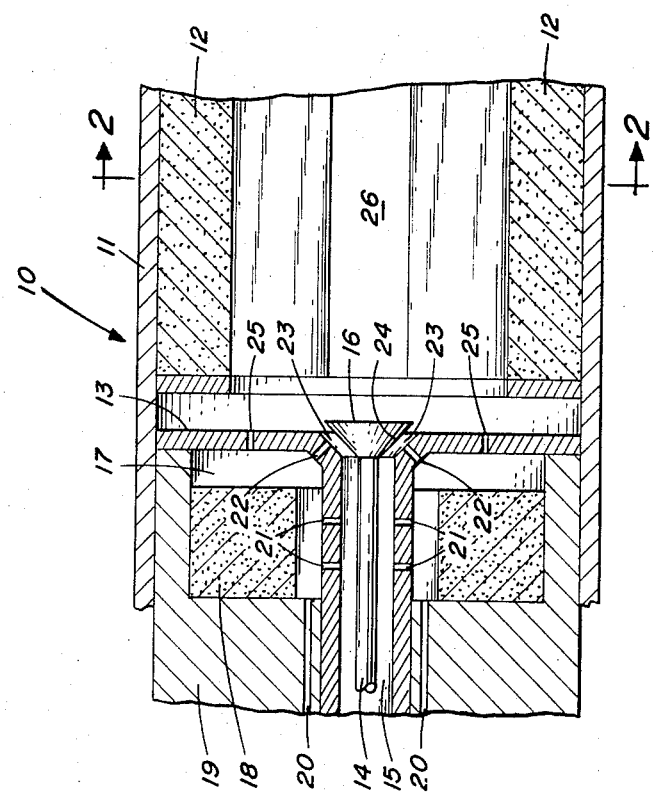
FIG. 1 is a cross-sectional view of a preferred embodiment of a hybrid rocket motor employing the improved injector of the present invention.

FIG. 1 illustrates a preferred embodiment of the improved hybrid injector. The hybrid rocket 10 has a outer casing 11 which contains the inner workings of the rocket motor. Solid propellant 12 forms a combustion chamber 26 which is initially star-shaped as shown best in FIG. 2. Central injector shaft member 14 is positioned for axial movement in the liquid oxidizer passageway 15 which communicates the supply of oxidizer, normally contained in a bladder, not shown, with the combustion chamber 26. Enlarged portion 16 of shaft 14 has a frustoconical surface 24 disposed thereon. Annular manifold 13 forms an annular passageway 17 together with supporting member 19. Solid propellant 18 is preferably bonded to support member 19 in annular chamber 17. Passages 21 and 22 lead from annular chamber 17 to passageway 15. Channels 20 lead from chamber 17 back to the bladder holding the liquid oxidizer supply, not shown, to thereby pressurize the bladder by means of the pressure in chamber 17. Optional openings 25 communicate the main combustion chamber 26 to chamber 17 to reinforce the pressure therein.

In operation, the gas generator 18, consisting primarily of a solid propellant, gives off a very hot gas which passes through openings 20, 21, 22 and depending on the relative pressures in combustion chamber 26 and chamber 17, maybe openings 25. Initially chamber 17 will be at the highest pressure but later chamber 26 pressure will exceed that of chamber 17. Optional channels 20 pressurize the oxidizer fuel bladder, not shown. The hot gases which pass through openings 21 and 22 come in contact with the liquid oxidizer passing through channel 15 and vaporize and aerate the liquid oxidizer passing into main combustion chamber 26. Openings 21 and 22 are arranged to promote turbulent flow to better aerate the liquid oxidizer and promote vaporization, although the manner in which the gases from the generator enter either the central injector or the combustion chamber depends on the specific application.

Obviously many modifications and variations of the present invention are possible in light of the above teachings. It is therefore to be understood that, within the scope of the appended claims, the invention may be practiced otherwise than as specifically described.

What is claimed is:

1. In a hybrid rocket motor having an injector means for injecting an oxidizer into a combustion chamber, the improvement comprising:

a manifold radially outwardly from said injector means having an annular passageway surrounding said injector means and openings therein which communicate the annular passageway with the injector means;

said openings being substantially perpendicular to the flow of oxidizer in said injector means to cause turbulent flow in the injector means;

a gas generating means in communication with said manifold to heat and aerate the oxidizer prior to entry into the combustion chamber;

said injector means comprising a central passageway connected at one end to a source of oxidizer and at the other end to the combustion chamber;

a shaft disposed along the longitudinal axis of said central passageway;

a frustoconical enlarged portion of said shaft at said other end of said passageway;

a frustoconical beveled surface forming a part of said other end of said passageway; and at least one of said openings extending through said frustoconical beveled surface normal to the frustoconical enlarged portion.

2. A hybrid rocket motor comprising:

a combustion chamber;

injector means having a wall forming a passageway extending to an oxidizer inlet in the combustion chamber for injecting oxidizer directly into the combustion chamber;

an annular chamber radially outwardly of and surrounding said injector means wall and passageway, said injector means wall also being a wall of said annular chamber, at least one opening in the wall of the injector means upstream of said combustion chamber oxidizer inlet to thereby provide direct communication between the injector means passageway and the annular chamber; and a gas generating means in communication with said annular chamber for gasifying and aerating the oxidizer upstream of the combustion chamber.

3. The device of claim 2 wherein said gas generating means is contained within said annular chamber.

4. The device of claim 3 wherein said gas generating means comprises a solid propellant.

5. The device of claim 4 having a space in said annular chamber between said solid propellant and said injector means wall.

6. The device of claim 2 wherein said at least one opening is perpendicular to the main flow of oxidizer in said passageway to thereby produce turbulent flow in the oxidizer.

7. The device of claim 2 wherein said wall contains a plurality of openings providing communication between the injector means passageway and the annular chamber.

8. The device of claim 2 wherein at least one additional opening directly communicates the gas generating means with the combustion chamber of the hybrid rocket motor.

9. The device of claim 7 wherein at least one channel leads from the gas generating means to thereby pressurize a bladder in the oxidizer supply container.

* * * * *